United States Patent
Oguma

(10) Patent No.: US 7,631,224 B2
(45) Date of Patent: Dec. 8, 2009

(54) PROGRAM, METHOD, AND MECHANISM FOR TAKING PANIC DUMP

(75) Inventor: Yukio Oguma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 446 days.

(21) Appl. No.: 11/023,184

(22) Filed: Dec. 28, 2004

(65) Prior Publication Data

US 2006/0069944 A1    Mar. 30, 2006

(30) Foreign Application Priority Data

Sep. 6, 2004    (JP)    ............................. 2004-258750

(51) Int. Cl.
    *G06F 11/00*    (2006.01)
(52) U.S. Cl. ............................. 714/37; 714/38; 714/45; 711/162; 717/124
(58) Field of Classification Search ................... 714/37, 714/45
    See application file for complete search history.

(56) References Cited

U.S. PATENT DOCUMENTS

| 5,293,612 | A | * | 3/1994 | Shingai | ....................... 711/159 |
| 5,809,542 | A | * | 9/1998 | Tsuboi et al. | ................ 711/162 |
| 6,898,736 | B2 | * | 5/2005 | Chatterjee et al. | .............. 714/37 |
| 2002/0029359 | A1 | * | 3/2002 | Kiyoi et al. | .................... 714/45 |
| 2003/0084374 | A1 | * | 5/2003 | Chatterjee et al. | .............. 714/33 |

FOREIGN PATENT DOCUMENTS

| JP | 8-95834 | 4/1995 |
| JP | 9-160811 | 6/1997 |

* cited by examiner

*Primary Examiner*—Emerson C Puente
(74) *Attorney, Agent, or Firm*—Staas & Halsey LLP

(57) ABSTRACT

To completely perform a memory data collecting process by a panic dump in the event of failure, in the configuration information about main memory 5 announced to an operating system by boot firmware, different areas (first main memory area and second main memory area) are set between activation of an operating system in a system operation mode and activation of an operating system in a dump operation mode. In the event of failure, activation is performed in the dump operation mode and a dumping process is performed with memory information in the event of failure maintained.

12 Claims, 11 Drawing Sheets

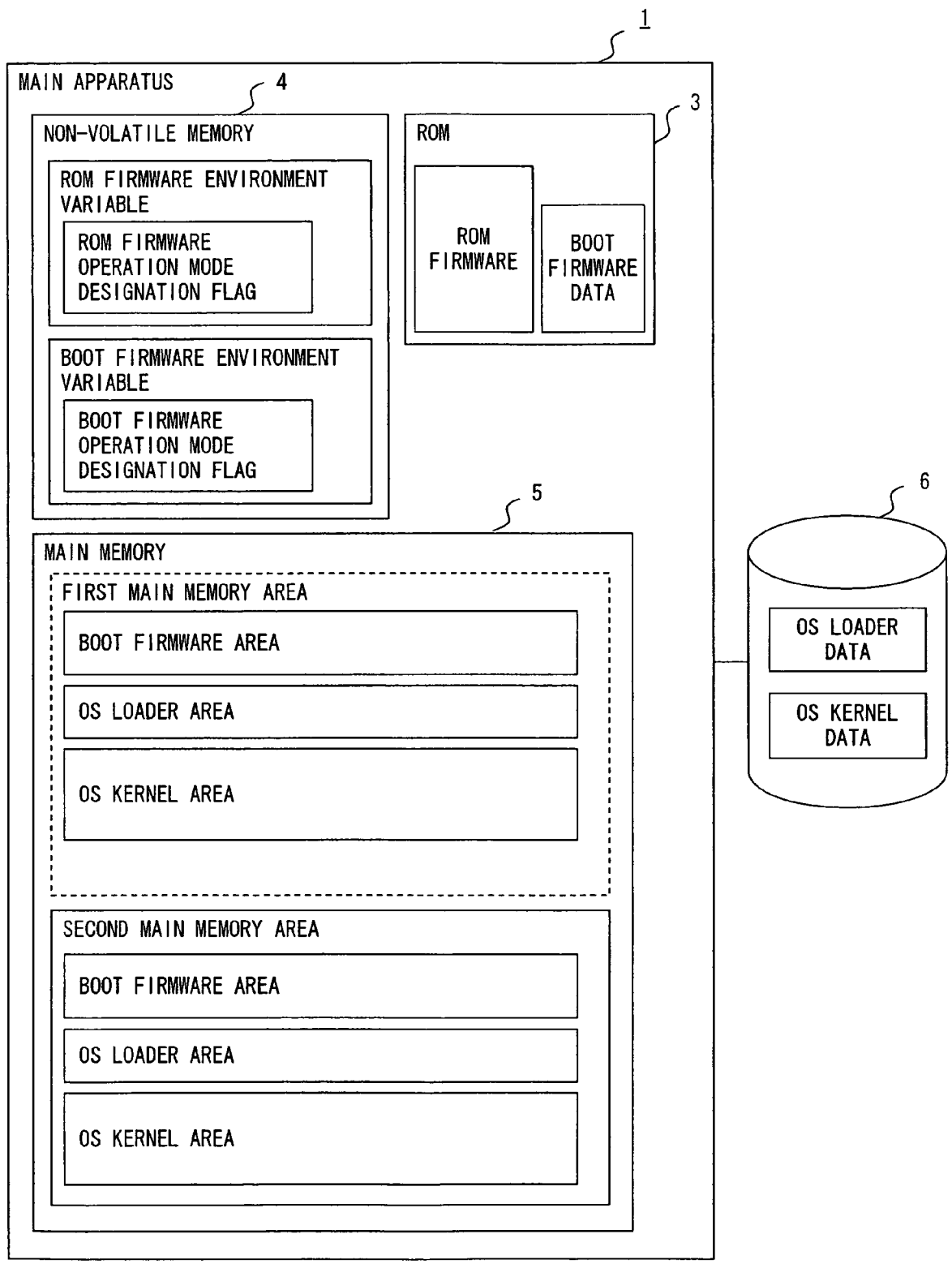
F I G. 1

| STARTING ADDRESS | ENDING ADDRESS |
|---|---|
| 0x000000C000000000 | 0x000000C0E7FFFFFF |
| 0x000000C0E8000000 | 0x000000C0FFFFFFFF |

FIG. 2B

| STARTING ADDRESS | ENDING ADDRESS |
|---|---|
| 0x0000000000000000 | 0x00000000F7FFFFFF |
| 0x00000000F8000000 | 0x00000000FFFFFFFF |
| 0x0000004000000000 | 0x00000040FFFFFFFF |
| 0x0000008000000000 | 0x00000080FFFFFFFF |
| 0x000000C000000000 | 0x000000C0FFFFFFFF |

F I G. 2 C

| STARTING ADDRESS | ENDING ADDRESS |
|---|---|
| 0x0000000000000000 | 0x00000000F7FFFFFF |
| 0x00000000F8000000 | 0x00000000FFFFFFFF |
| 0x0000004000000000 | 0x00000040FFFFFFFF |
| 0x0000008000000000 | 0x00000080FFFFFFFF |
| 0x000000C000000000 | 0x000000C0DFFFFFFF |

FIG. 2D

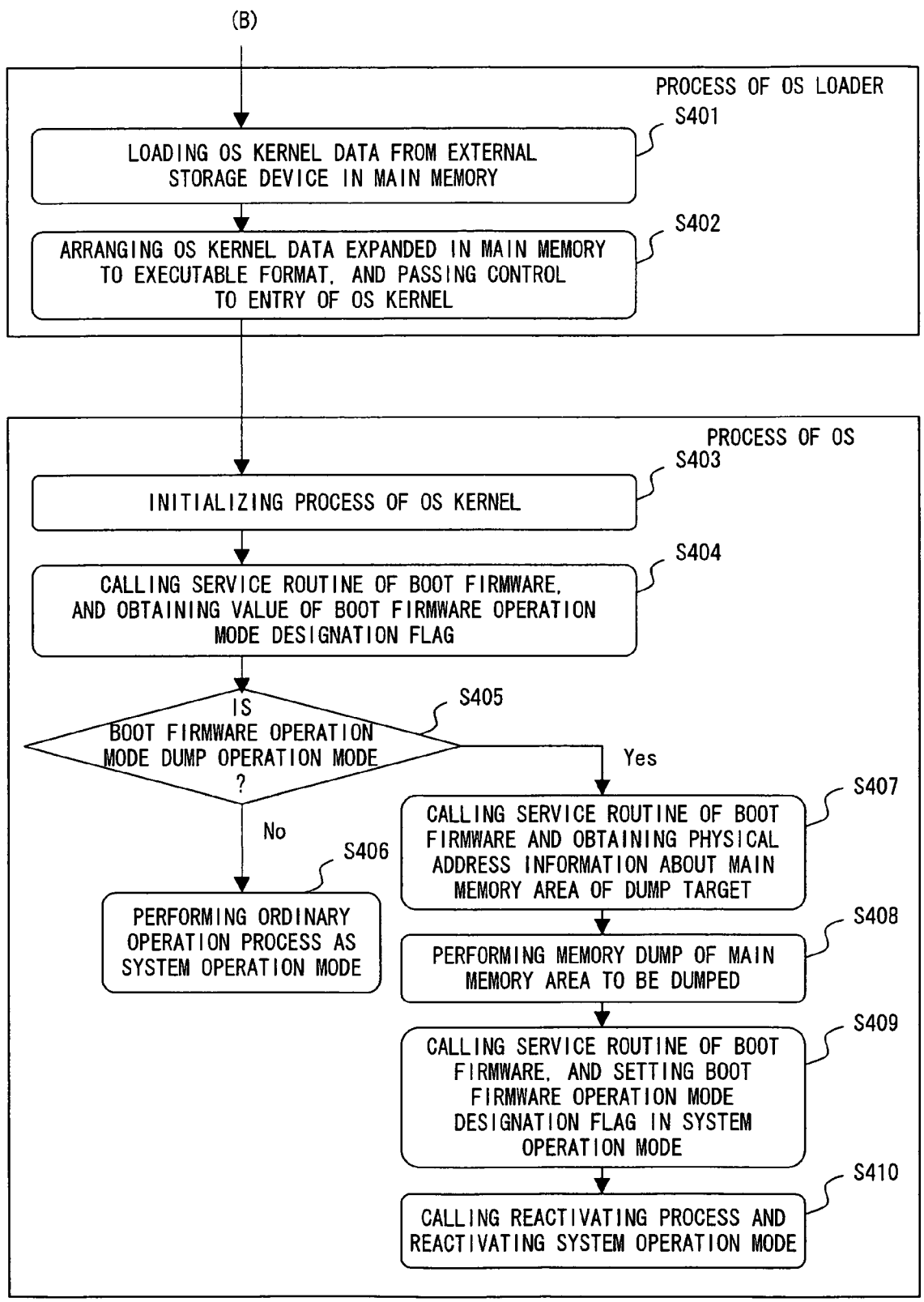
F I G. 4

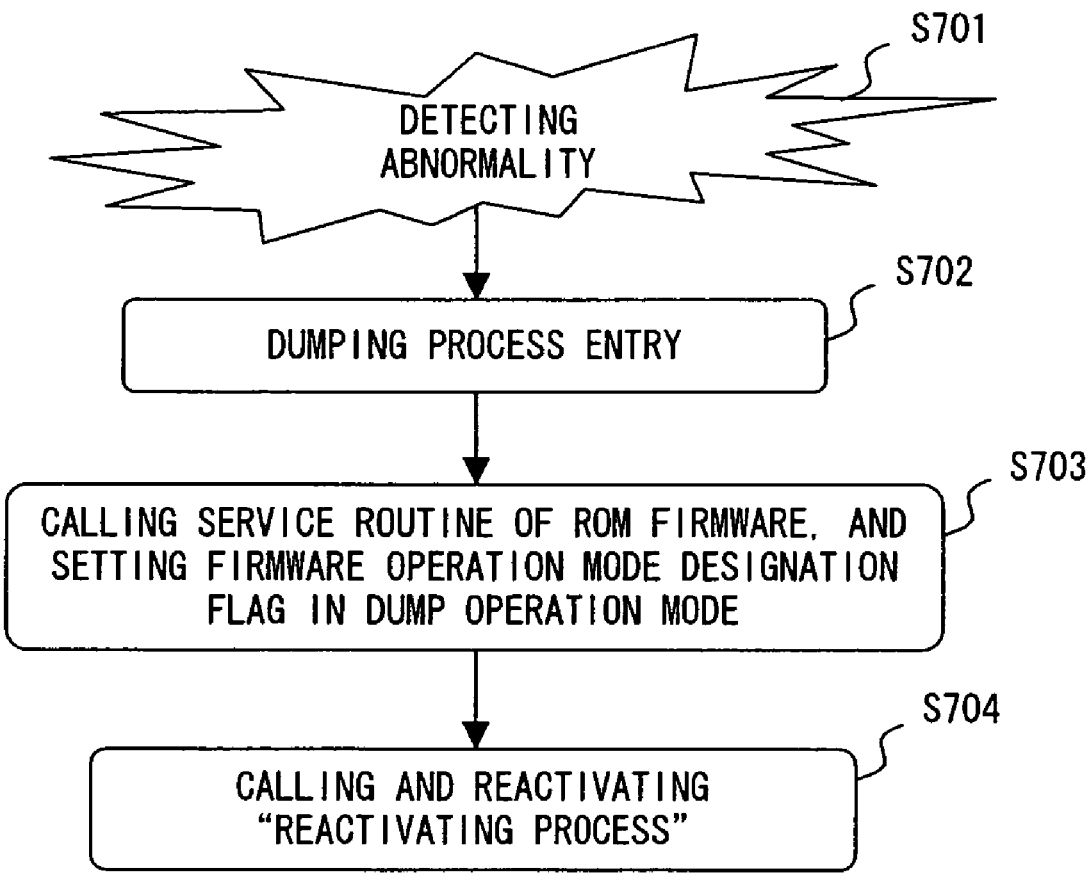
F I G. 7

PROGRAM, METHOD, AND MECHANISM FOR TAKING PANIC DUMP

BACKGROUND OF THE INVENTION

1. Field of the Invention

The present invention relates to a program, a method, and a mechanism for taking a panic dump in the event of failure.

2. Description of the Related Art

With the widespread use of the information communications technology, an information processing device, especially a server system operated in a basic system, requires high reliability. Therefore, when a failure occurs during the operation the system, it is indispensable to immediately collect information and continue the operation.

Generally, when a system cannot continue its operation due to the occurrence of fatal failure, the function of dumping memory data, that is, the panic dump facility, is used in the event of failure.

The panic dump facility stores the contents of memory the moment when abnormality which disables the system to continue its operation is detected. Normally, the OS (operating system) or a program operating in a kernel performs a dumping process.

For example, when the CPU receives an abnormality detection interrupt signal while operating the program in the kernel, the CPU passes control to the memory dump program in the kernel to take a memory dump.

Since a memory dump program is incorporated into a kernel, necessary information for a failure analysis can be dumped in the optimum size.

However, if the cause of the abnormality is, for example, a defective program operating in the kernel, the inconsistency of control data, the destruction of memory storing the kernel (program), the abnormal hardware, etc., it is possibly necessary in the dumping process to obtain the resources (for example, destroyed memory) which is the cause of the abnormality. In this case, since there occurs again abnormality during the dumping process, the dumping process can fail.

Furthermore, depending on the type of abnormality, the system can hang up and control cannot be passed to the panic dumping process. As a result, the memory data cannot be successfully dumped.

To solve the above-mentioned problems, there is a stand-alone dump to reset the system with the memory data stored, reset the hardware resources other than the memory data to be dumped, activate again the dumping process program, and dump the memory data in the current environment.

For example, if taking a memory dump by a memory dump program incorporated into a kernel as described above cannot be successfully performed, and the system hangs up, then the system is reset with the data stored in the memory as is, the memory dump program (stand-alone dump program) which is different from the memory dump program incorporated into the kernel, and the memory dump is taken.

By the stand-alone dump, a dump can be taken regardless of the environment (inconsistency of control data of the kernel, destruction of memory, etc.) in which the abnormality occurs. When temporary abnormality occurs in the hardware, the hardware can be reset for a normal operation at a strong possibility. When constant hardware abnormality occurs, there can be a strong possibility that abnormality can be detected the POST (power on self test) diagnostics performed when the system is reactivated by a resetting operation, and in the process of initializing hardware.

However, there has been the following problem in the conventional stand-alone dump.

1) To reset the system and download a stand-alone dump, it is necessary to store in advance the data of the memory area to be overwritten by the stand-alone dump. That is, it is necessary to store the data by the boot firmware to boot the OS before loading (storing) the stand-alone dump.

To attain this, it is necessary to have hardware resources required to temporarily save memory data on the boot firmware, or reserve in a disk, etc. a dedicated partition for control by the boot firmware to store the data in a file.

It is not advantageous in cost to have dedicated hardware resources. When a dedicated partition is obtained, it is to be guaranteed that there is a dedicated partition for temporarily saving memory data on a connected disk. However, since it is not controlled from the boot firmware as to whether or not a dedicated partition is reserved on a connected disk, there is the problem that the management of the partition of a disk is inevitably complicated.

2) Since a stand-alone dump is booted with the memory data stored in the event of failure, the data of the boot firmware in the memory and the OS loader (program for loading the memory with the OS) is completely overwritten in the booting process in the system. Therefore, when there occurs an abnormal condition between the kernel and the above-mentioned boot firmware and OS loader, the data of the firmware cannot be taken as dump data, thereby complicating a necessary search.

3) Since the server system is normally loaded with main memory of several GB or several tens of GB, it is not practical to take data of all memory in a panic dump. Therefore, it is normal to take only an area of kernel text, kernel data, etc. of the operating system necessary for a check. To obtain the information of the area, it is necessary to search and analyze the table in the kernel, but the information depends on the version number of the kernel. Therefore, when a stand-alone dump which is a different program from the operating system is used, it is necessary to prepare a stand-alone dump program corresponding to the version number of the operating system. Therefore, the version number of the stand-alone dump has to match the version number of the corresponding to operating system. If they do not match each other, it is not possible to search the table in the kernel. As a result, the dumping process fails or all implemented memory data is to be dumped.

Japanese Patent Laid-open Publication No. Hei 08-095834 discloses the system for solving the above-mentioned problems 1) and 2) by providing a system dump producing program use area not used during the normal operation in the main storage memory area of the system aside from the operating system use area used by the operating system, and by loading and executing the system dump producing program from an external storage device to the system dump producing program use area after resetting a computer system and before reloading the operating system to the operating system use area when the system dump cannot be taken due to the hang up, etc., thereby taking a system dump of an operating system use area.

However, in the stand-alone dump system other than the operating system, the problem pointed out in 3) above cannot be solved. That is, in the system disclosed by Japanese Patent Laid-open Publication No. Hei 08-095834, a system dump can be taken for an area indicated in a list of areas for which a system dump is to be obtained from the table information for management of the area on the main storage device allocated statically or dynamically. Therefore, a list of target areas has to be prepared in advance.

Since the information for preparation of the information about the list largely depends of the version number of the operating system, the problem that the version control of the operating system and the version control of the list are inevitably complicated cannot be solved. Furthermore, since it is necessary to prepare the list of an area for which a system dump has to be taken, the area dynamically allocated during the operation of the operating system cannot be minutely anticipated, and it is difficult to efficiently collect the necessary information in a large server system having a complicated system configuration. If the version numbers do not unfortunately match each other, a system dump cannot be taken for a necessary area.

SUMMARY OF THE INVENTION

The present invention has been developed to solve the above-mentioned problems, and aims to provide a program, a method, and a mechanism for taking a panic dump capable of correctly performing a memory data producing process by a panic dump in the event of failure.

To attain the above-mentioned advantage, a recording medium for recording a program used to direct a computer to perform a panic dump producing process according to the present invention includes:

an area definition information obtaining process of obtaining a second area definition information from an area definition information unit storing the second area definition information about a second area other than a first area used for an operating system that is an area of a storage unit of an information processing device according to an operation mode designation information for control of an operation of the information processing device;

an operating system storing process of storing an operating system in an area according to the second area definition information;

a dump target area calculating process of calculating as a dump target area a predetermined area in the first area corresponding to a predetermined area in an area according to the second area definition information; and a dumping process of reading and outputting information stored in the dump target area.

A panic dump producing method according to the present invention includes:

an area definition information obtaining process of obtaining a second area definition information from an area definition information unit storing the second area definition information about a second area other than a first area used for an operating system that is an area of a storage unit of an information processing device according to an operation mode designation information for control of an operation of the information processing device;

an operating system storing process of storing an operating system in an area according to the second area definition information;

a dump target area calculating process of calculating as a dump target area a predetermined area in the first area corresponding to a predetermined area in an area according to the second area definition information; and a dumping process of reading and outputting information stored in the dump target area.

A panic dump producing mechanism according to the present invention includes:

an area definition information obtaining unit for obtaining a second area definition information from an area definition information unit storing the second area definition information about a second area other than a first area used for an operating system that is an area of a storage unit of an information processing device according to an operation mode designation information for control of an operation of the information processing device;

an operating system storage unit for storing an operating system in an area according to the second area definition information;

a dump target area calculation unit for calculating as a dump target area a predetermined area in the first area corresponding to a predetermined area in an area according to the second area definition information; and a dumping process unit for reading and outputting information stored in the dump target area.

BRIEF DESCRIPTION OF THE DRAWINGS

FIG. 1 shows an example of an important unit of the configuration according to an embodiment of the present invention;

FIG. 2B shows an example of a memory information table in a dump operation mode generated by the ROM firmware;

FIG. 2C shows an example of a memory information table in a system operation mode generated by the ROM firmware;

FIG. 2D shows an example of a memory information table in a system operation mode generated by the ROM firmware;

FIG. 4 is a flowchart of the process of the OS loader and the OS according to the embodiment of the present invention;

FIG. 7 is a flowchart showing an example of a variation of the process from the time when the OS detects abnormality to the time when the reactivating process is performed.

DESCRIPTION OF THE PREFERRED EMBODIMENTS

Figure 2A:
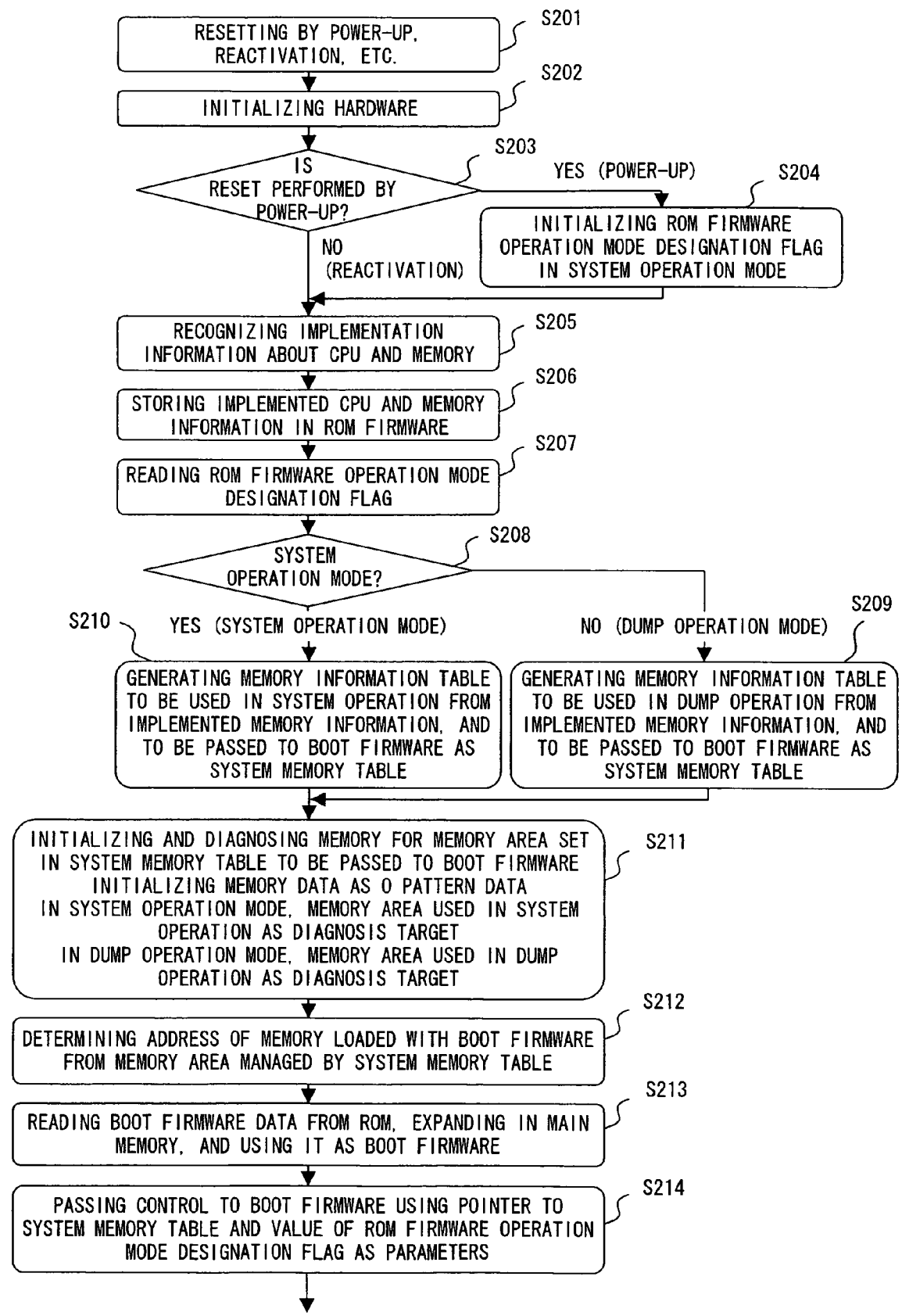
FIG. 2A is a flowchart of the process of the ROM firmware according to an embodiment of the present invention.

The invention according to one embodiment is a recording medium for recording a program used to direct a computer to perform a panic dump produce process according to the present invention includes: an area definition information obtaining process of obtaining a second area definition information from an area definition information unit storing the second area definition information about a second area other than a first area used for an operation system that is an area of a storage unit of an information processing device according to an operation mode designation information for control of an operation of the information processing device; an operating system storing process of storing an operating system in an area according to the second area definition information; a dump target area calculating process of calculating as a dump target area a predetermined area in the first area corresponding to a predetermined area in an area according to the second area definition information; and a dumping process of reading and outputting information stored in the dump target area.

According to the embodiment of the present invention, a predetermined area in the first area (area used in the event of failure) corresponding to a predetermined area in the second area obtained in the area definition information obtaining process is calculated in the dump target area calculating process, and the data in the calculated dump target area is output. Therefore, the data in the area used in the event of failure can be correctly obtained.

Since the operating system operating in the first area, that is, the area used in the event of failure, and the operating system operating in the second area manage the same areas (for example, when the memory address of the data including a necessary program for operation of an operating system, etc. is managed according to a memory management table, etc.), a predetermined area in the first area corresponding to a predetermined area in the second area obtained in the area definition information obtaining process can be easily calculated in the dump target area calculating process.

The invention according to another embodiment of the present invention is the recording medium for recording the program used to direct a computer to perform a panic dump producing process including: a failure notifying process of detecting and notifying of an occurrence of failure in a necessary component for operation of an information processing device; an operating mode designation information storing process of storing the operation mode designation information for control of an operation of the information processing device in an operation mode designation information storage unit according to a notification of the failure notifying process; a reactivating process of reactivating the information processing device with the status of an area used in the event of failure maintained; an area definition information obtaining process of obtaining a second area definition information from an area definition information unit storing the second area definition information about a second area other than a first area used for an operating system that is an area of a storage unit of an information processing device according to an operation mode designation information for control of an operation of the information processing device; an operating system storing process of storing an operating system in an area according to the second area definition information; a dump target area calculating process of calculating as a dump target area a predetermined area in the first area corresponding to a predetermined area in an area according to the second area definition information; and a dumping process of reading and outputting information stored in the dump target area.

According to the embodiment of the present invention, in addition to the effect of the invention, when a failure occurs, the information processing device (or a component configuring the information processing device, and a program for control of them) is reactivated in the reactivating process, the area definition information about the second area other than the first area used in the operating system is obtained in the area definition information obtaining process from the area definition information unit storing the area definition information about a plurality of areas for an area of a storage unit in the information processing device, and the operating system is loaded in the area according to the obtained, area definition information, the resetting process can be performed with the area used in the event of failure held.

The invention according to another embodiment is the recording medium for recording the program for taking a panic dump in which the dump target area calculating process calculates the dump target area from the difference between the offset of the leading position of the first area and the leading position of the second area and a predetermined area in the second area.

According to the invention described in the embodiment mentioned above, a dump target area can be easily calculated and obtained by calculating the first area corresponding to a predetermined area in the second area by the difference between the offset of the leading position of the first area and the leading position of the second area, and a predetermined area in the second area.

The invention according to another embodiment is a panic dump producing method including: an area definition information obtaining process of obtaining a second area definition information from an area definition information unit storing the second area definition information about a second area other than a first area used for an operating system that is an area of a storage unit of an information processing device according to an operation mode designation information for control of an operation of the information processing device; an operating system storing process of storing an operating system in an area according to the second area definition information; a dump target area calculating process of calculating as a dump target area a predetermined area in the first area corresponding to a predetermined area in an area according to the second area definition information; and a dumping process of reading and outputting information stored in the dump target area.

The invention according to another embodiment is a panic dump producing mechanism including: an area definition information obtaining unit for obtaining a second area definition information from an area definition information unit storing the second area definition information about a second area other than a first area used for an operating system that is an area of a storage unit of an information processing device according to an operation mode designation information for control of an operation of the information processing device; an operating system storage unit for storing an operating system in an area according to the second area definition information; a dump target area calculation unit for calculating as a dump target area a predetermined area in the first area corresponding to a predetermined area in an area according to the second area definition information; and a dumping process unit for reading and outputting information stored in the dump target area.

According to the invention described in the embodiments when a failure occurs, a predetermined area in the first area (area used in the event of failure) corresponding to a predetermined area in the second area obtained in the area definition information obtaining process is calculated in the dump target area calculating process (or the dump target area calculation unit), and the data of the calculated dump target area is output. Therefore, the data in the area used in the event of failure can be correctly obtained.

Since the operating system operating in the first area, that is, the area used in the event of failure, and the operating system operating in the second area manage the same areas, a predetermined area in the first area corresponding to a predetermined area in the second area obtained in the area definition information obtaining process can be easily calculated in the dump target area calculating process (or the dump target area calculation unit).

As described above, according to the present invention, a program, a method, and a mechanism for taking a panic dump capable of correctly performing a memory data collecting process by a panic dump in the event of failure can be provided.

The embodiments of the present invention are explained below by referring to FIGS. 1 through 8.

FIG. 1 shows an example of the important unit of the configuration according to an embodiment of the present invention.

An information processing device 1 shown in FIG. 1 is connected to a CPU 2, not shown in the attached drawings, for controlling each component of an information processing device and performing a process depending on the program according to an embodiment of the present invention, ROM (read only memory) 3 storing ROM firmware and boot firmware according to an embodiment of the present invention, non-volatile memory 4 configured by NVRAM (non-volatile RAM) and flash memory, etc. for storing an environment variable used by ROM firmware, an environment variable used by boot firmware (for example, a ROM firmware operation mode designation flag, a boot firmware operation mode designation flag, etc.), etc., main memory 5 for storing boot firmware, an OS loader, an OS kernel, etc.

The information processing device 1 according to an embodiment of the present invention is also connected to an external storage device 6 (for example, a magnetic disk device) storing an OS loader and an OS kernel. The external storage device 6 shown in FIG. 1 is externally connected to the information processing device 1, but it can be mounted in the device.

When the main apparatus is powered up, the ROM firmware stored in the ROM 3 is activated, the hardware is initialized and diagnosed, and the configuration recognizing process of the hardware is performed. In the configuration recognizing process, the number of CPUs 2 and the configuration of the implemented memory (implemented main memory 5) are recognized, and the configuration information is stored in the ROM firmware environment variable storage area.

The ROM firmware reads the boot firmware from a predetermined address of the ROM 3 and stores it in the main memory 5, expands it as executable boot firmware in the main memory 5, and control is passed to the boot firmware.

When the ROM firmware passes control to the boot firmware, it offers the memory configuration information about the hardware recognized in the configuration recognizing process, or the method of announcing the memory configuration information.

The boot firmware recognizes the implementation status of the memory of the entire system, and operates the OS loader and the OS in the memory implemented environment.

After the activation of the OS, a part of the program is resident in the main memory 5, and offers various services to the OS loader and the OS.

Therefore, the OS loader and the OS kernel do not directly check the information about the hardware, but recognizes the abstract of the configuration information (for example, not the memory configuration information about the actually implemented memory, but the memory configuration information of the memory announced by the boot firmware), thereby enhancing the versatility independent of the specifications of each piece of hardware.

The first main memory area and the second main memory area are determined according to the memory configuration information notified from the ROM firmware to the boot firmware.

The main memory 5 according to the embodiment of the present invention is configured by a first main memory area 7 and a second main memory area 8, but there is to be memory area logically divided into two, and can be one physical memory unit. Furthermore a plurality of (physically divided) memory units. The memory can also be logically divided into two or more memory areas (for example, a first main memory area, a second main memory area, and a third main memory area).

FIG. 2A through FIG. 4 are flowcharts of the processes performed when the information processing device 1 is powered up, and when the reactivating process is performed (the reactivating process performed when a panic occurs in the OS).

FIG. 2A is a flowchart of the process of the ROM firmware according to an embodiment of the present invention. When the information processing device 1 is powered up or reactivated (step S201), the CPU 2 provided in the information processing device 1 refers to the ROM firmware stored at a predetermined address of the ROM 3, and performs an initializing process on the hardware (step S202). For example, the hardware such as the main memory 5, the external storage device 6, etc. is initialized at an instruction.

When the hardware is initialized in step S202, the CPU 2 determines whether the cause of the resetting (in this case, not the operation mode information relating to a ROM firmware operation mode designation flag, but, for example, the information about the power-up performed by a power supply switch or about the power-up by the reactivation) is the power-up or the reactivation (step S203).

When the factor of the resetting is the power-up, the CPU 2 passes control to step S204, and initializes the ROM firmware operation mode designation flag stored at a predetermined address of the ROM 3 into the system operation mode. When the initialization of the ROM firmware operation mode designation flag is completed, control is passed to step S205.

When the factor of the resetting is not the power-up in step S203 (in the case of reactivation), the CPU 2 passes control to step S205 without initializing the ROM firmware operation mode designation flag.

In step S205, the CPU 2 performs the recognizing process on the implemented information, etc. (hereinafter referred to simply as configuration information) relating to the component configuring the information processing device 1.

For example, by reading the register in each component, the configuration information about the CPU 2, memory, etc. (for example, the number of implemented CPUs 2 and the implemented capacity of the memory, etc.) which is provided in the information processing device 1 and on which the initializing process is normally completed in step S202, the configuration information can be obtained.

When the recognizing process about the configuration information is completed on the CPU 2, the memory, etc., the CPU 2 passes control to step S206, and stores the CPU 2 and the memory information in the ROM firmware environment variable storage area of the ROM 3.

In step S208, the CPU 2 reads a ROM firmware operation mode designation flag stored at a predetermined address in the ROM 3, and performs a process of determining whether or not the current mode is the system operation mode.

In the present embodiment, the ROM firmware operation mode designation flag is 1-byte data, and it is determined that the current mode is a dump operation mode when the flag indicates 0xFF. When the flag indicates a value other than 0xFF, it is determined that the current mode is the system operation mode. However, when the flag is not limited to the above-mentioned applications, but predetermined values can be set for the flag such that the dump operation mode and the system operation mode can be determined.

In step S208, when the CPU 2 determines that the current mode is not the system operation mode, control is passed to step S209, a memory information table for use in the dump operation mode, that is, the memory information table defining the second main memory area, is generated from the implemented memory information obtained in the process in step S205, and the table is passed as a system memory table to the boot firmware.

A system memory table refers to a table for definition of a memory area (or a memory mechanism) accessible by boot firmware, an OS loader, and an OS kernel (or the OS including the OS kernel).

Figure 3:
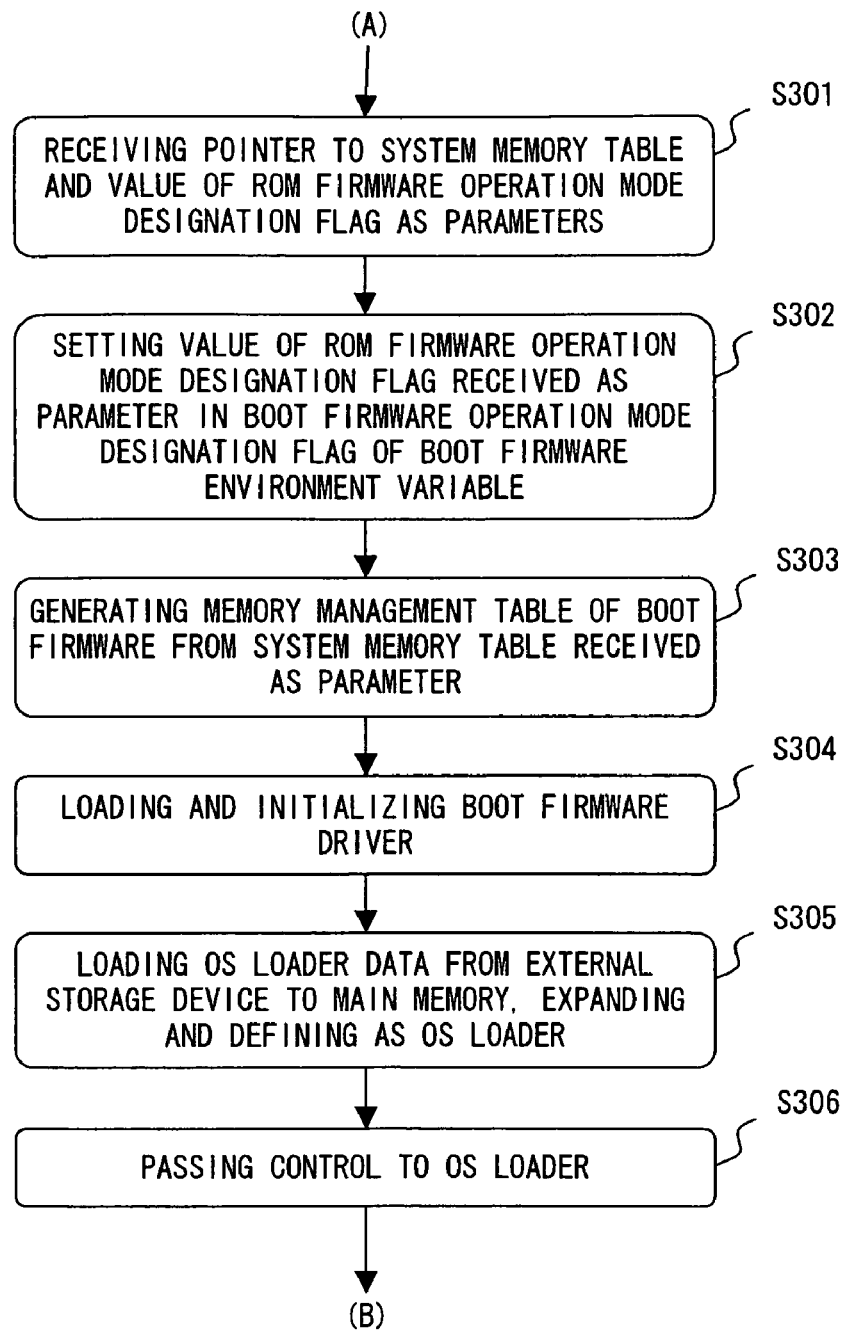
FIG. 3 is a flowchart of the process of the boot firmware according to an embodiment of the present invention.

Therefore, in the processes (shown in FIGS. 2A through 4) explained below, when the system is operated in the dump operation mode, the process is performed on the second main memory area (for example, the area in which the boot firmware in step S213 is expanded, the area in which the OS loader in step S305 shown in FIG. 3 is expanded, the area in which the OS kernel in step S401 shown in FIG. 4 is expanded, etc.).

In step S209, the ROM firmware generates, for example, a table shown in FIG. 2B.

The memory information table shown in FIG. 2B shows an example of the case in which the ROM firmware defines that only a 512 MB continuous area starting from 0x000000C000000000 is available by the boot firmware, the OS loader, and the OS kernel in the dump operation mode.

In the memory information table shown in FIG. 2B, for example, the boot firmware uses the first 128 MB area, and the OS loader and the OS kernel use the next 358 MB area.

In step S208, when the CPU 2 determines that the current mode is the system operation mode, control is passed to step S210, and a memory information table for use in the system operation, that is, the memory information table for definition of the first main memory area, is generated from the implemented memory information obtained in the process in step S205, and is passed as a system memory table to the boot firmware.

Therefore, in the processes explained below (processes in FIGS. 2A through 4), when the current mode is the system operation mode, the process is performed on the first main memory area (for example, the area in which the boot firmware in step S213 is expanded, the area in which the OS loader in step S305 shown in FIG. 3 is expanded, the area in which the OS kernel in step S401 shown in FIG. 4 is expanded, etc.).

In step S210, the ROM firmware generates, for example, a table shown in FIG. 2C or 2D.

The memory information table shown in FIG. 2C has a leading 4 GB continuous area for every fourth 256 GB space area. The boot firmware uses the 128 MB area starting at the address 0x00000000F8000000, and the other areas are used by the boot firmware, the OS loader, and the OS kernel.

That is, in this example, the ROM firmware defines all main memory 5 as the first main memory area in the system operation mode (therefore, in this case, the first main memory area and the second main memory area are defined only in the dump operation mode).

The memory information table shown in FIG. 2D has a leading 4 GB continuous area for every fourth 256 GB space area. The boot firmware uses the 128 MB area from the address 0x00000000F8000000 with the trailing 512 MB of a continuous area starting at 0x000000C000000000 hidden, and the OS kernel, etc. can only access a continuous area of 4 GB-512 MB.

That is, the trailing 512 MB of a continuous area starting at 0x000000C000000000 is defined as the second main memory area, and the other areas are defined as the first main memory area. Therefore, in the system operation mode, the boot firmware, the OS loader, and the OS kernel can access only the first main memory area. When the memory information table is completely generated, the CPU 2 passes control to step S211, and the memory initializing process and diagnostic process are performed on the memory area set on the system memory table to be passed to the boot firmware.

For example, the memory initializing process is performed by writing a predetermined pattern (for example, all 0s) to the data of the memory. The memory diagnostic process can be performed by writing and reading data for a predetermined pattern, and determining whether or not a written pattern matches a read pattern, thereby determining an abnormal condition.

Furthermore, in the present embodiment, all available memory areas set as a system memory table are target of memory diagnosis. That is, in the system operation mode, all memory areas used during the system operation are a target of the memory diagnosis. Similarly, in the dump operation mode, all memory areas used during the dumping operation are a target of memory diagnosis. In step S211, when the memory initializing process and diagnostic process are completed, the CPU 2 passes control to step S212, and the address of the memory for storing the boot firmware is determined from the memory area managed by the system memory table.

For example, the starting address (offset address from the memory area) at which the boot firmware is stored in the memory area defined by the system memory table is read from a predetermined address of the ROM firmware environment variable storage area of the ROM 3.

When the address of the memory for storing the boot firmware is determined, the CPU 2 passes control to step S213, reads the boot firmware stored at the predetermined address in the ROM 3, and the boot firmware read out is expanded at the address.

In step S213, when the expanding process of the boot firmware on the main memory 5 is completed, the CPU 2 passes control to step S214, and control is passed to the boot firmware using the pointer to the system memory table and the value (set value) of the ROM firmware operation mode designation flag as parameters.

The process of passing control to the boot firmware using the pointer to the system memory table and the value of the ROM firmware operation mode designation flag as parameters is, for example, performed by storing the pointer to the system memory table and the ROM firmware operation mode designation flag at the predetermined address of the memory area accessible by the boot firmware, reading the instruction starting address of the main memory 5 in which the boot firmware is expanded, and setting them in the PC (program counter).

In the process explained above, the boot firmware is expanded in the main memory 5, and then the CPU 2 is operated at an instruction of the boot firmware.

FIG. 3 is a flowchart of the process of the boot firmware according to an embodiment of the present invention. In step S214 shown in FIG. 2A, when control of the CPU 2 is passed to the boot firmware from the ROM firmware, CPU 2 passed control to step S301, and obtains the pointer from the ROM firmware to the system memory table and the value of the ROM firmware operation mode designation flag as parameters.

If, for example, the ROM firmware stores the pointer to the system memory table and the ROM firmware operation mode designation flag at the predetermined address in the memory area accessible by the boot firmware in step S214 shown in FIG. 2A, the pointer to the system memory table and the ROM firmware operation mode designation flag set by the ROM firmware can be obtained by referring to the predetermined address by the CPU 2.

When the pointer to the system memory table and the ROM firmware operation mode designation flag are obtained, the CPU 2 passes control to step S302, and the obtained pointer to the system memory table and the ROM firmware operation mode designation flag are stored in the area for storing the pointer to the system memory table and the area for storing the boot firmware operation mode designation flag in the area for storing the boot firmware environment variable storage area of the non-volatile memory 4.

In step S303, a memory management table for management of the memory of the boot firmware is generated from the system memory table received as a parameter.

When the memory management table of the boot firmware is generated, the CPU 2 passes control to step S304, and the loading process and the initializing process on the boot firmware driver (for example, the driver (SCSI driver, etc.) for accessing the external storage device 6 storing an OS loader and an OS kernel, a driver for enabling the network communications by operating the network device, etc.) are performed.

Then, the OS loader is read from the external storage device 6 and expanded in the main memory 5 (step S306), and control of the CPU 2 is passed from the boot firmware to the OS loader (step S306).

Also in this case, as in the process in step S214 shown in FIG. 2A, the instruction starting address of the main memory 5 in which the OS loader is expanded is read and set in the PC.

In the process explained above, the OS loader is expanded in the main memory 5, and then the CPU 2 is operated at an instruction of the OS loader.

FIG. 4 is a flowchart of the process of the OS loader and the OS according to the embodiment of the present invention.

In step S306 shown in FIG. 3, when the control of the CPU 2 is passed from the boot firmware to the OS loader, the CPU 2 passes the control to step S401, reads the OS kernel data from the external storage device 6, and expands (stores) the data in the main memory 5.

When the process of expanding the OS kernel data is completed, the CPU 2 passes control to step S402, arranges the OS kernel data expanded in the main memory 5 in an executable format, and passes control to the OS kernel (for example, the CPU 2 executes instructions from the leading address of the instructions of the OS kernel).

When control of the CPU 2 is passed to the OS kernel, it is further passed to step S403, and the OS kernel is initialized.

When the OS kernel initializing process is completed, the CPU 2 calls the service routine of the boot firmware, and obtains a boot firmware operation mode designation flag at the predetermined address of the area in which the boot firmware environment variable is stored in the non-volatile memory 4 (step S404). The service routine of the boot firmware refers to an interface between the boot firmware and the OS kernel, and is a program capable of using the function of the boot firmware from the OS kernel.

In step S405, when the boot firmware operation mode designation flag does not indicate the dump operation mode, control is passed to step S406, and the normal operating process is performed as a system operation mode.

In step S405, when the boot firmware operation mode designation flag is a dump operation mode, control is passed to step S407, the service routine of the boot firmware is called, and the physical address information about the main memory area to be dumped is obtained. Then, control is passed to step S408, and the memory dumping process is performed on the first main memory area.

In step S409, the service routine of the boot firmware is called, and the boot firmware operation mode designation flag stored in the non-volatile memory 4 is set in the system operation mode.

When the memory dumping process is completed, the CPU 2 passes control to step S410, calls the reactivating process, and reactivates the system in the system operation mode.

Figure 5:
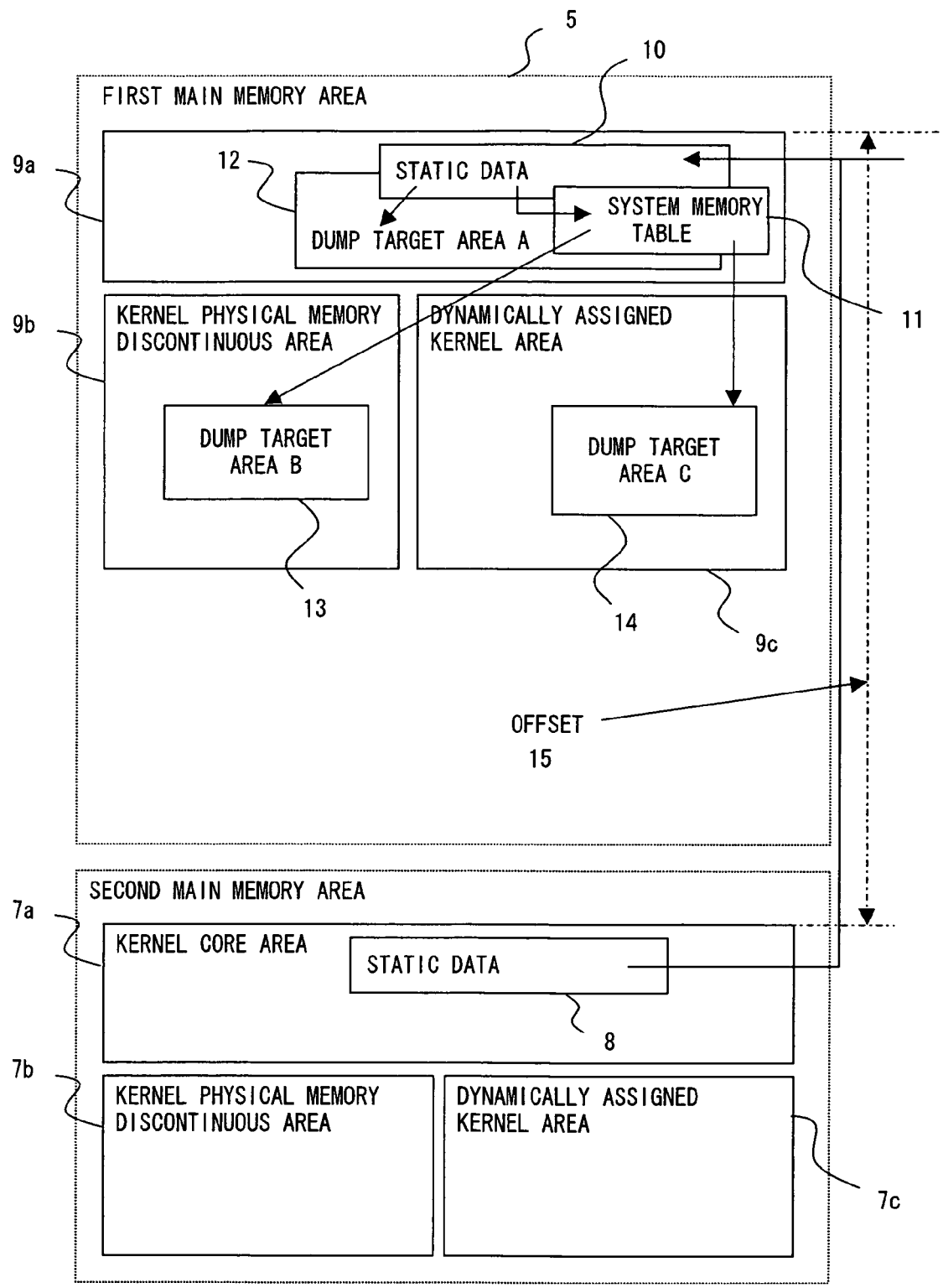
FIG. 5 shows a practical example of the processes from step S407 to S409 shown in FIG. 5.

FIG. 5 shows a practical example of the process in step S407 shown in FIG. 4 of the dump program of the OS kernel operating in the second main memory area determining the dump target area of the first main memory area. FIG. 5 shows the first main memory area and the second main memory area arranged in the main memory 5 shown in FIG. 1. Since the OS is activated in the dump operation mode, the first main memory area cannot be accessed as a rule, and only the second main memory area can be accessed. Therefore, the OS can access the physical address of the first main memory area only by the service routine of the boot firmware activated by the dump program or the service routine of the ROM firmware.

In the second main memory area shown in FIG. 5, the OS kernel is expanded into a kernel core area 7a, a kernel physical memory discontinuous area 7b, and a dynamically assigned kernel area 7c, and the CPU 2 is operating at an instruction of the OS kernel expanded in the second main memory area.

Also in the first main memory area shown in FIG. 5, the OS kernel is expanded in a kernel area 9a, a kernel physical memory discontinuous area 9b, and a dynamically assigned kernel area 9c. The OS kernel expanded in these areas is the OS kernel expanded in the second main memory area before the activation (reactivation) of the OS kernel.

Described below is the process of determining a desired dump target area expanded in the first main memory area by the dump program of the OS kernel expanded in the second main memory area.

(1) When a text area and data area (hereinafter referred to simply as a static text area, or a static data area) assigned to an area whose physical addresses are continuous such as the kernel core area 9a is a target of the dumping process, the logical address of static data 8 in the kernel and the logical address of static data 10 are the same if they belong to the same kernel. Therefore, a service routine of the boot firmware is called from the OS kernel, and the base address (leading address of the kernel area 9a) of the kernel area 9a in the first main memory area is obtained.

Then, the value (offset 15) is obtained by subtracting the leading address of the kernel core of the first main memory area from the leading address of the kernel core area 7a of the second main memory area.

Furthermore, the logical address of the static data 8 in the kernel of the second main memory area is converted into a physical address based on the address conversion table (system memory table), and the offset 15 is subtracted from the conversion result, thereby obtaining the physical address of the static data 10 of the first main memory area corresponding to the static data 8 of the second main memory area. By performing a similar process on the static text area, the physical address (for example, the physical address of a dump target area 12) of the static text area in the first main memory area which is a target of the dumping operation can be obtained based on the static text area of the second main memory area.

Normally, since the offset 15 is equal to the result of subtracting the leading address of the first main memory area from the leading address of the second main memory area, the address of a static data area or a text area of the kernel area 9a which is the first main memory area to be dumped can be easily obtained from the information about the base address of the first main memory area and the second main memory area, and the address conversion table (system memory table) in the second main memory area operating in the dump operation mode in the static data area and the static text area in the kernel core area 7a.

(2) Since the physical address is assigned to a discontinuous area, the data in a system memory table (address conversion table) 11 in the kernel of the first main memory area is referred to and a corresponding physical address can be calculated when the physical address of the dump target area (for example, a dump target area 13, a dump target area 14) in the first main memory area cannot be calculated according to the information about the second main memory area in the calculation based on the offset 15 explained in (1) above, and when a dumping process is perform on the data area in the kernel arranged at a logical address different from that when the operation is performed in the second main memory area not in the static data area because the logical address is dynamically assigned.

The physical address of the place where the system memory table 11 in the kernel area 9a in the first main memory area can be obtained in the process of (1) above.

The kernel core areas 7a and 9a are the basic portions of the kernel text (static text area) and the kernel data (static data area), and the data to be linked to each control data in the kernel is defined, and is assigned to an area having continuous physical addresses.

Figure 6:
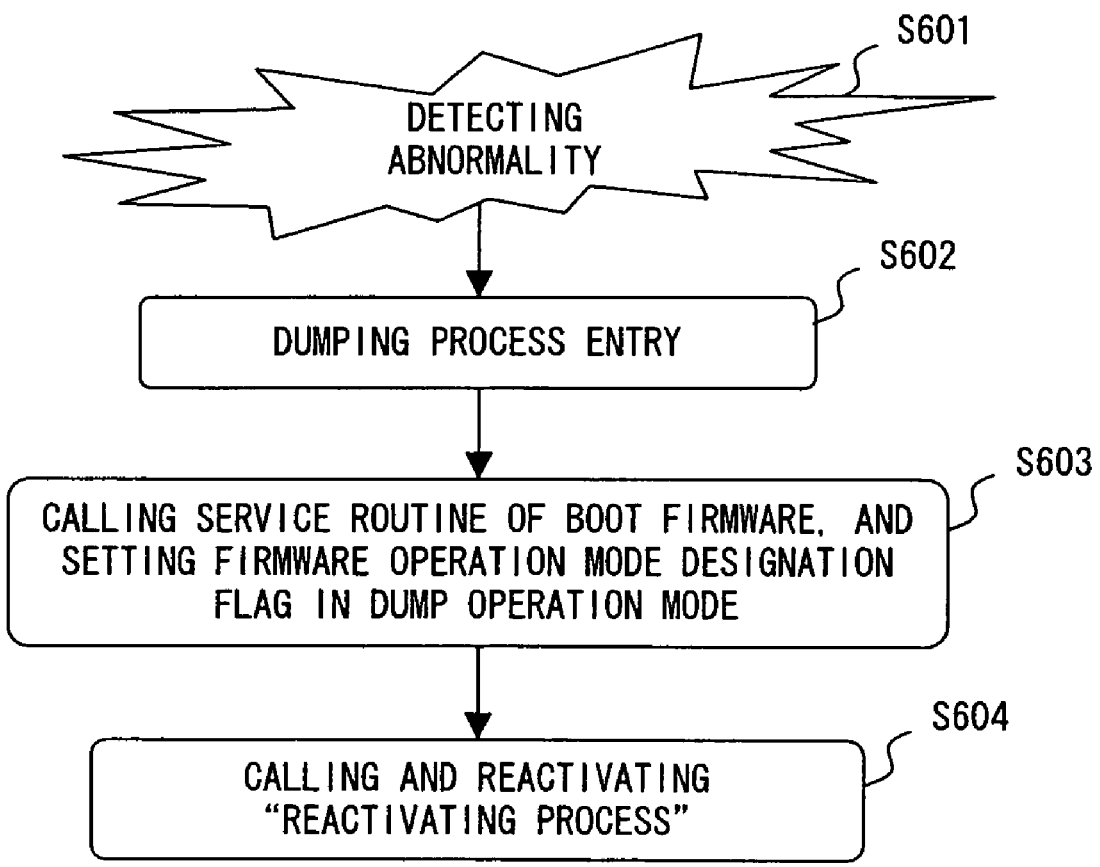
FIG. 6 is a flowchart of the process from the time when the OS detects abnormality to the time when the reactivating process is performed.

The process explained by referring to FIGS. 2A through 5 is the process up to the activation of the OS by the power-up of the information processing device 1 or the reactivation by an OS panic. FIG. 6 shows the process performed from the detection of abnormality by the OS to the reactivating process.

FIG. 6 is a flowchart of an example of the process performed from the detection of abnormality by the OS to the reactivating process.

When the information processing device 1 (OS) is operating in the system operation mode, and if a hardware fault which is fatal to continue the system operation such as the destruction of memory, etc., then the OS detects the abnormality by an interrupt signal from the hardware, an error notification from the OS kernel (step S601).

When the OS detects abnormality, the CPU 2 passes control to step S602, and makes a dump processing entry. For example, when the interrupt handler is activated in response to an interrupt signal from the hardware, an instruction start address of the dump program is set in the PC of the CPU 2, and the CPU 2 operates according to the instruction of the dump processing entry program.

When the OS simultaneously uses a plurality of programs (processes, tasks, applications), programs other than the dumping process entry program can naturally operate.

When control is passed to step S603, a service routine of a boot firmware is called from the dumping process entry program, a ROM firmware operation mode designation flag stored at a predetermined address of a ROM firmware environment variable storage area reserved in the non-volatile memory 4, or a ROM firmware operation mode designation flag and a firmware operation mode designation flag stored at a predetermined address of the firmware environment variable storage area are set in the dump operation mode.

When the process of setting the dump operation mode is completed, the CPU 2 passes control to step S604, calls the reactivating process, and starts reactivation. That is, control is passed to step S201 shown in FIG. 2A, and the reactivating process (resetting process) is started.

In FIG. 6, in the process in step S603, the service routine of the firmware performs the process of setting the dump operation mode. However, by preparing the interface (unit) for directly accessing the ROM firmware from the OS, a dump operation mode can be set for a ROM firmware operation mode designation flag, or a ROM firmware operation mode designation flag and a firmware operation mode designation flag.

FIG. 7 shows an example of a variation of the process of performing a reactivating process after the OS detects abnormality.

As in FIG. 6, if a fatal fault such as the destruction of memory, etc. occurs in the hardware and the system cannot continue its operation in the status in which the information processing device 1 (OS) is operating in the system operation mode, an interrupt signal from the hardware and the error notification from the OS kernel allow the OS to detect abnormality (step S701).

When the OS detects abnormality, the CPU 2 passes control to step S702, and enters the dumping process (activates the dumping process entry program). Then, control is passed to step S703, the service routine of the ROM firmware is called from the dumping process entry program, and a dump operation mode is set for at least one of the ROM firmware operation mode designation flag and the firmware operation mode designation flag stored in the non-volatile memory 4.

When the dump operation mode is set, the CPU 2 passes control to step S704, calls the reactivating process, and starts reactivation. That is, control is passed to step S201 shown in FIG. 2A, and the reactivating process is started.

It is also possible that the power supply unit not shown in FIG. 1 (for example, the system monitor mechanism for control or monitor of power supply) can set a ROM firmware operation mode designation flag and a firmware operation mode designation flag in the dump operation mode when the system is activated.

Figure 8:
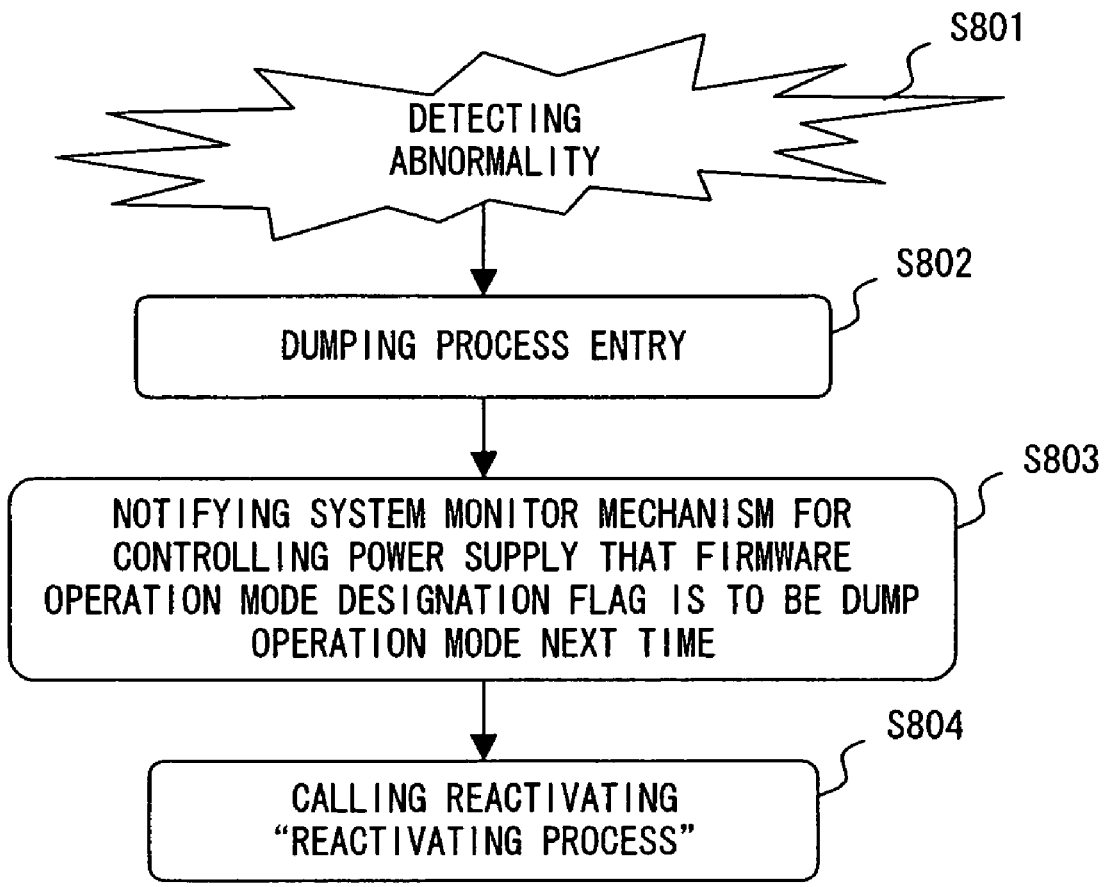
FIG. 8 shows an example of a process from the time when the OS detects abnormality to the time when the reactivating process is performed when the power source control unit has a dump operation mode/system operation mode switch unit.

FIG. 8 shows an example of the process performed after the OS detects abnormality until the reactivating process is performed when the power supply unit has a switch unit for the dump operation mode and the system operation mode.

As in FIG. 6, if a fatal fault such as the destruction of memory, etc. occurs in the hardware and the system cannot continue its operation in the status in which the information processing device 1 (OS) is operating in the system operation mode, an interrupt signal from the hardware and the error notification from the OS kernel allow the OS to detect abnormality (step S801).

When the OS detects abnormality, the CPU 2 passes control to step S802, and enters the dumping process (activates the dumping process entry program).

Then, control is passed to step S803, the dumping process entry program notifies the system monitor mechanism for control of power supply of the ROM firmware operation mode designation flag, or the ROM firmware operation mode designation flag and the firmware operation mode designation flag to be set in the dump operation mode when the system is activated next time (the processes shown in FIGS. 2A through 4).

For example, a memory area referred to by the program having the function of the system monitor mechanism is reserved in advance in the non-volatile memory 4, and the system monitor mechanism operation mode designation flag is stored at a predetermined address in the memory area (for example, 1-byte data of 0xFF is set as the dump operation mode, and the data other than 0xFF is set as the system operation mode).

As shown in FIG. 6, the OS calls the service routine of the boot firmware, and the system monitor mechanism operation mode designation flag is set as the dump operation mode.

On the other hand, the system monitor mechanism refers to the system monitor mechanism operation mode designation flag when the system is activated (for example, in step S201 shown in FIG. 2A). When it is set as the dump operation mode, the ROM firmware operation mode designation flag, or the ROM firmware operation mode designation flag and the firmware operation mode designation flag can be set as the dump operation mode by the system monitor mechanism.

When the system monitor mechanism is notified of the dump operation mode, the CPU 2 passes control to step S804, calls the reactivating process, and starts reactivation. That is, control is passed to step S201, and the reactivating process is started.

The system monitor mechanism can, for example, set the ROM firmware operation mode designation flag, or the ROM firmware operation mode designation flag and the boot firmware operation mode designation flag as the dump operation mode and executes reactivation.

Thus, although the OS hangs up and control cannot be passed to the dumping process entry program, the system can be reactivated in the dump operation mode, thereby successfully taking the dump.

In the explanation above, the first main memory area and the second main memory area are also separated in the system operation mode and the dump operation mode, but the present invention is not limited to these applications. That is, in the system operation mode, all areas of the main memory 5 are used as the first main memory area shown in FIG. 1, and the first main memory area and the second main memory area can be separated and used only in the dump operation mode. In this case, the area used at a low frequency in the first main memory area and the area unnecessary for troubleshooting, etc. are assigned as the second main memory area.

When the data taken in the dumping process is used in troubleshooting, it is necessary to refer to a kernel-specific table (for example, a data-arrangement defined table) for determination of an area required in troubleshooting. However, since the kernel operating in the dump operation mode is the same as that operating in the system operation mode, it is possible to obtain information such as an address, etc. at which predetermined data is arranged using the same table, thereby easily performing troubleshooting.

Additionally, since the system dump producing program operates using the same kernel (operating system) as in the system operation mode, it is not necessary to generate in advance a list of areas for which the system dump is taken from the table information (for example, a memory management table, etc.) for management of the area in the main memory to determine the dump producing area, and it is not necessary to manage the version number of a kernel and the version number of an area list (or the version number of the table information for generation of an area list).

Therefore, dumping a wrong area or accessing a non-memory-implemented area by non-matching in the version number of a kernel and the version number of an area list (or the version number of the table information for generation of an area list), thereby abnormally terminating the system dump can be avoided. Furthermore, excess version control is not required.

Since the dump producing program incorporated into a kernel operates at a system dump, it is possible to take a dump of the optimum area required in troubleshooting from the memory data in the event of failure.

To take a dump, the system is once reset. Therefore, a dump can be taken by a stable operating system, and a dump is taken not only for a predetermined area, but also the data in a kernel is analyzed by a troubleshooting program, etc. so that the cause of failure and a suspicious portion can be designated in the event of failure to a certain extent. Depending on the analysis result at that time, a dump producing area can be extended.

In the dump operation mode, including the boot firmware for booting the operating system, the operating system is activated in a different physical memory space from the system operation mode. Therefore, although abnormality occurs in the interface between the operating system and the boot firmware, and the system hangs up, the data in the boot firmware area when a failure occurs in the event of the dump can be taken without destruction.

Since the data in the memory area used in the system operation mode and to be dumped is not overwritten, it is not necessary to temporarily save memory data by the boot firmware. Therefore, the cost can be reduced with the reliability enhanced. As a result, it is also not necessary to reserve a dedicated partition for temporary save of memory data, and the partition of a disk can be easily managed.

Furthermore, it is possible to take a dump regardless of the environment (inconsistency of control data of a kernel, memory destruction, etc.) in which failure occurs.

When a temporary hardware abnormality occurs, it is possible to enhance the possibility of a normal operation by temporarily resetting the system. Therefore, although constant hardware abnormality occurs, there is a higher possibility that abnormality can be detected in the POST diagnosis and the initializing process of hardware when the system is reactivated.

What is claimed is:

1. A recording medium for recording a program to cause an information processing device to perform a panic dump producing process, the program comprising:

obtaining a second area definition information from an area definition information unit, the second area definition information defining a second area in a storage unit that is different from a first area in the storage unit used for an operating system according to an operation mode designation information for control of an operation of the information processing device;

storing an operating system in the second area of the storage unit defined by the second area definition information;

determining according to the second area definition information, a predetermined area in the first area of the storage unit corresponding to a predetermined area in the second area as a dump target area designated by the difference between an offset of a leading position of the first area and a leading position of the second area and the predetermined area in the second area; and reading and outputting information stored in the dump target area.

2. The recording medium for recording the program according to claim 1, the program further comprising:

detecting and notifying of an occurrence of failure in a component necessary for operation of an information processing device;

storing the operation mode designation information in an operation mode designation information storage unit; and reactivating the information processing device while maintaining a status of an area that is used when the failure occurred.

3. The recording medium for recording the program according to claim 2, wherein
a panic dump is taken in which the dump target area calculating process calculates the dump target area according to information for management of the first area.

4. The recording medium for recording the program according to claim 1, wherein
the determined panic dump is taken according to information for management of the first area.

5. A panic dump producing method executed by a computer, comprising:
obtaining a second area definition information from an area definition information unit, the second area definition information defining a second area of a storage unit of the computer that is different from a first area of the storage unit used for an operating system, according to an operation mode designation information for controlling an operation of an information processing device;
storing an operating system in the second area of the storage unit of the computer defined by the second area definition information;
calculating, according to the second area definition information, a predetermined area in the first area of the storage unit corresponding to a predetermined area in the second area as a dump target area designated by the difference between an offset of a leading position of the first area and a leading position of the second area and the predetermined area in the second area; and
reading and outputting information stored in the dump target area.

6. The method according to claim 5, further comprising:
detecting and notifying of an occurrence of failure in a component necessary for operation of the information processing device;
storing the operation mode designation information in an operation mode designation information storage unit according to the detecting; and
reactivating the information processing device while maintaining a status of an area that is used when the failure occurred.

7. The method according to claim 6, wherein
a panic dump is taken in which the calculating calculates the dump target area according to information for management of the first area.

8. The method according to claim 5, wherein
a panic dump is taken according to information for management of the first area.

9. A panic dump producing mechanism, comprising:
a storage unit having a first area for an operating system;
an area definition information unit storing second area definition information for defining a second area in the storage unit, the second area in the storage unit different from the first area;
an area definition information obtaining unit for obtaining the second area definition information from the area definition information unit according to an operation mode designation information for control of an operation of the information processing device;
an operating system storing unit for storing an operating system in an area in the second area according to the second area definition information;
a dump target area calculating unit for calculating a predetermined area in the first area of the storage unit corresponding to a predetermined area in the second area as a dump target area, according to the second area definition information, the dump target area designated by the difference between an offset of a leading position of the first area and a leading position of the second area and the predetermined area in the second area; and
a dumping unit for reading and outputting information stored in the dump target area.

10. The mechanism according to claim 9, further comprising:
a failure notifying unit detecting and notifying of an occurrence of failure in a component necessary for operation of an information processing device;
an operating mode designation information storing unit storing the operation mode designation information in an operation mode designation information storage unit; and
a reactivating unit reactivating the information processing device while maintaining a status of an area that is used when the failure occurred.

11. The mechanism according to claim 10, wherein
a panic dump is taken in which the dump target area calculating unit calculates the dump target area according to information for management of the first area.

12. The mechanism according to claim 9, wherein
a panic dump is taken according to information for management of the first area.

* * * * *

UNITED STATES PATENT AND TRADEMARK OFFICE
CERTIFICATE OF CORRECTION

PATENT NO. : 7,631,224 B2  Page 1 of 1
APPLICATION NO. : 11/023184
DATED : December 8, 2009
INVENTOR(S) : Yukio Oguma It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 765 days.

Signed and Sealed this

Second Day of November, 2010

David J. Kappos
*Director of the United States Patent and Trademark Office*